(12) United States Patent
Kang

(10) Patent No.: US 7,210,361 B2
(45) Date of Patent: May 1, 2007

(54) DEVICE FOR MEASURING THE TIGHTNESS OF A TRANSMISSION BELT

(76) Inventor: Hsin Fa Kang, P.O. Box 90, Tainan City, 70499 (TW)

( * ) Notice: Subject to any disclaimer, the term of this patent is extended or adjusted under 35 U.S.C. 154(b) by 74 days.

(21) Appl. No.: 11/234,166

(22) Filed: Sep. 26, 2005

(65) Prior Publication Data

US 2007/0068281 A1   Mar. 29, 2007

(51) Int. Cl.
*G01L 1/04* (2006.01)
(52) U.S. Cl. .............................. 73/862.392; 73/862.451
(58) Field of Classification Search ........... 73/862.392, 73/862.451
See application file for complete search history.

(56) References Cited

U.S. PATENT DOCUMENTS

| | | | | |
|---|---|---|---|---|
| 4,372,172 A | * | 2/1983 | Gombocz et al. ...... | 73/862.392 |
| 4,564,099 A | * | 1/1986 | Uozumi ...................... | 198/323 |
| D297,818 S | * | 9/1988 | Tell .............................. | D10/83 |
| 5,295,571 A | * | 3/1994 | Van Den Bogaert et al. .... | 198/502.1 |
| 5,997,423 A | * | 12/1999 | Kwon ........................ | 474/103 |
| 6,029,798 A | * | 2/2000 | Miller .................... | 198/810.01 |
| 6,047,814 A | * | 4/2000 | Alles et al. ............ | 198/810.02 |
| 6,137,974 A | * | 10/2000 | Williams et al. ............ | 399/165 |
| 6,460,679 B1 | * | 10/2002 | Stuffel et al. ............... | 198/337 |
| 6,574,846 B1 | * | 6/2003 | Kang .......................... | 29/239 |
| 6,966,102 B2 | * | 11/2005 | Shiue .......................... | 24/196 |
| 7,117,989 B2 | * | 10/2006 | Weigel et al. ......... | 198/810.04 |
| 7,140,486 B2 | * | 11/2006 | Kim ...................... | 198/810.03 |

* cited by examiner

*Primary Examiner*—Edward Lefkowitz
*Assistant Examiner*—Freddie Kirkland, III

(57) ABSTRACT

A device for measuring the tightness of a transmission belt comprises a hilt, an insertion tube, a frame, a retaining piece and an engaging piece. The hilt is provided with a transverse handle, a sleeve and a retractable axle having a section of a screw thread. The insertion tube, connected to the retractable axle by screwing has an inner passage with an upper screw-thread section and a lower screw-thread section. The insertion tube further includes surface graduations for inspection. The frame has a central through hole and two belt-passing slots respectively on two side arms thereof said frame. The retaining piece is connected to the bottom of the frame. The engaging piece is attached to the bottom terminal of the retractable axle. Thereby, a belt will be inserted through the belt-passing slots of the frame and brought into contact with the engaging piece.

4 Claims, 6 Drawing Sheets

DEVICE FOR MEASURING THE TIGHTNESS OF A TRANSMISSION BELT

FIELD OF THE INVENTION

The present invention relates to devices for measuring the tightness of a transmission belt, more particularly to a device for measuring the tightness of a transmission belt having a scale for a user to register two numeric values in the beginning and at the end in a process in which a movable axle is pushed against a transmission belt. Thereby, the tightness of the belt can be recognized for future adjustments.

BACKGROUND OF THE INVENTION

The transmission belts for generators, automobile air conditioners and driving wheels are one important driving mechanism. However, if a transmission belt is too loose, a desired driving effect cannot be attained. A belt's state of tightness is conventionally inspected by an experience technician's visual measurement. Further, is can be detected by pressing the belt by hands, or it can even be detected by listening to the sound when it is operating. However, such measurements based on experience can be easily influenced by the person who does the inspection, therefore being easily distorted by a technician's inexperience and subjectivity. On the other hand, inspecting a transmission belt's tightness is important to driving safety, and suppose that a belt is still valid and a technician retires it, this will lead to a waste of automobile parts and increase car maintenance fee.

SUMMARY OF THE INVENTION

Accordingly, the primary objective of the present invention is to provide a device for measuring the tightness of a transmission belt.

The present invention is featured by a structure comprising a hilt, an insertion tube, a frame, a retaining piece and an engaging piece. The hilt is provided with a handle extended vertically to the axis of the hilt, a sleeve, and a retractable axle whose upper portion is further provided with a screw thread. The insertion tube, connected to the retractable axle by screwing, has an inner space defining a passage that has an upper screw-thread section capable of being engaged with the screw thread on the retractable axle and a lower screw-thread section. The insertion tube further includes surface graduations for inspection. The frame, attached to the bottom of the insertion tube, has a central through hole and two belt-passing slots respectively on two side arms of the frame. A rotatable shaft is connected to each of the belt-passing slots. The retaining piece has an uprightly erected screw-thread projection for connecting the insertion tube and a through hole for passing the retractable axle. The engaging piece is attached to the bottom terminal of the retractable axle.

BRIEF DESCRIPTION OF THE DRAWINGS

FIG. 4 is a perspective view of an engine to which a device for measuring the tightness of a transmission belt of the present invention is attached to.

DETAILED DESCRIPTION OF THE INVENTION

The various objects and advantages of the present invention will be more readily understood from the following detailed description when read in conjunction with the appended drawings.

Figure 1:
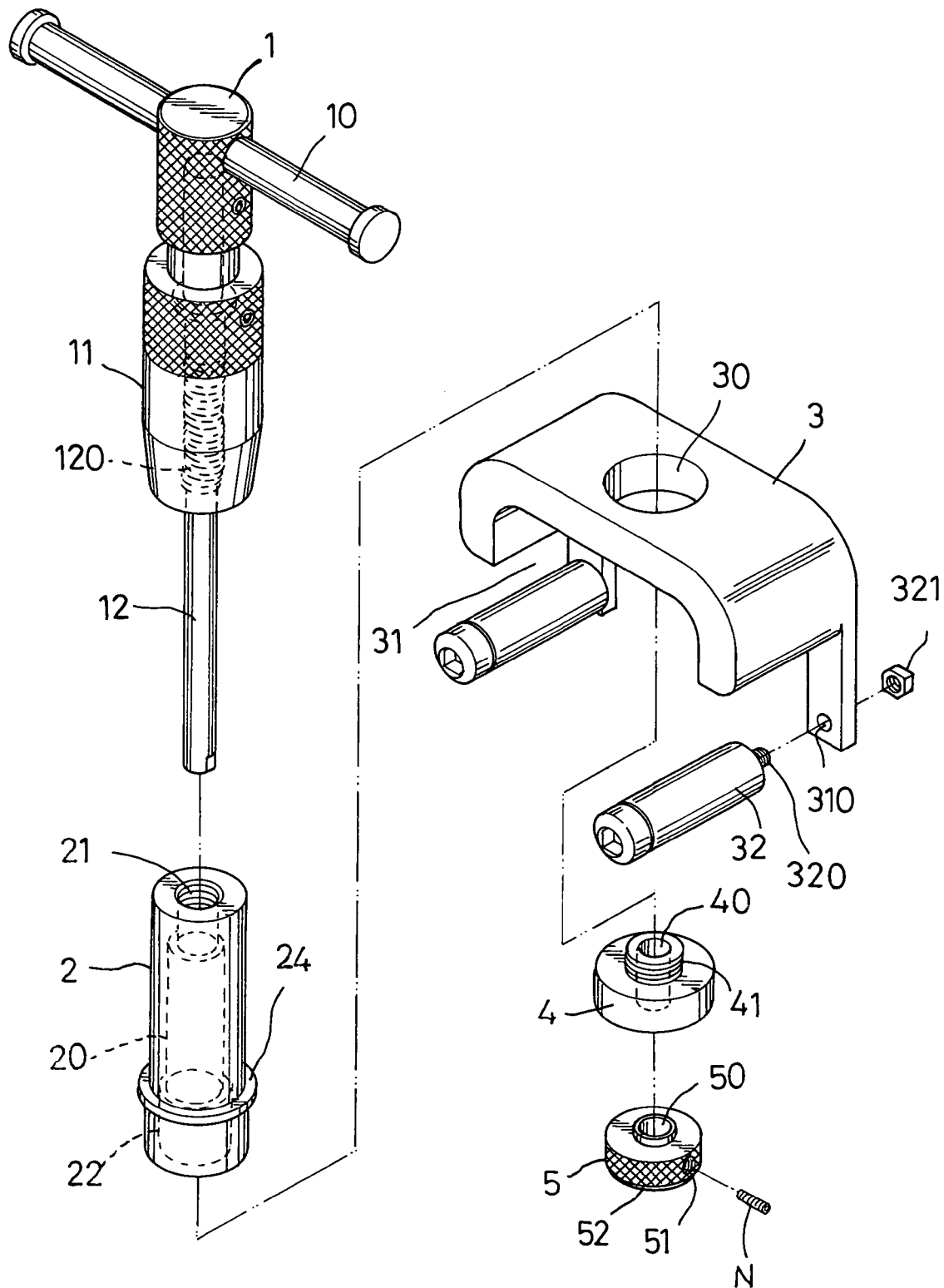
FIG. 1 is an exploded perspective view of a device for measuring the tightness of a transmission belt of the present invention.
Figure 2:
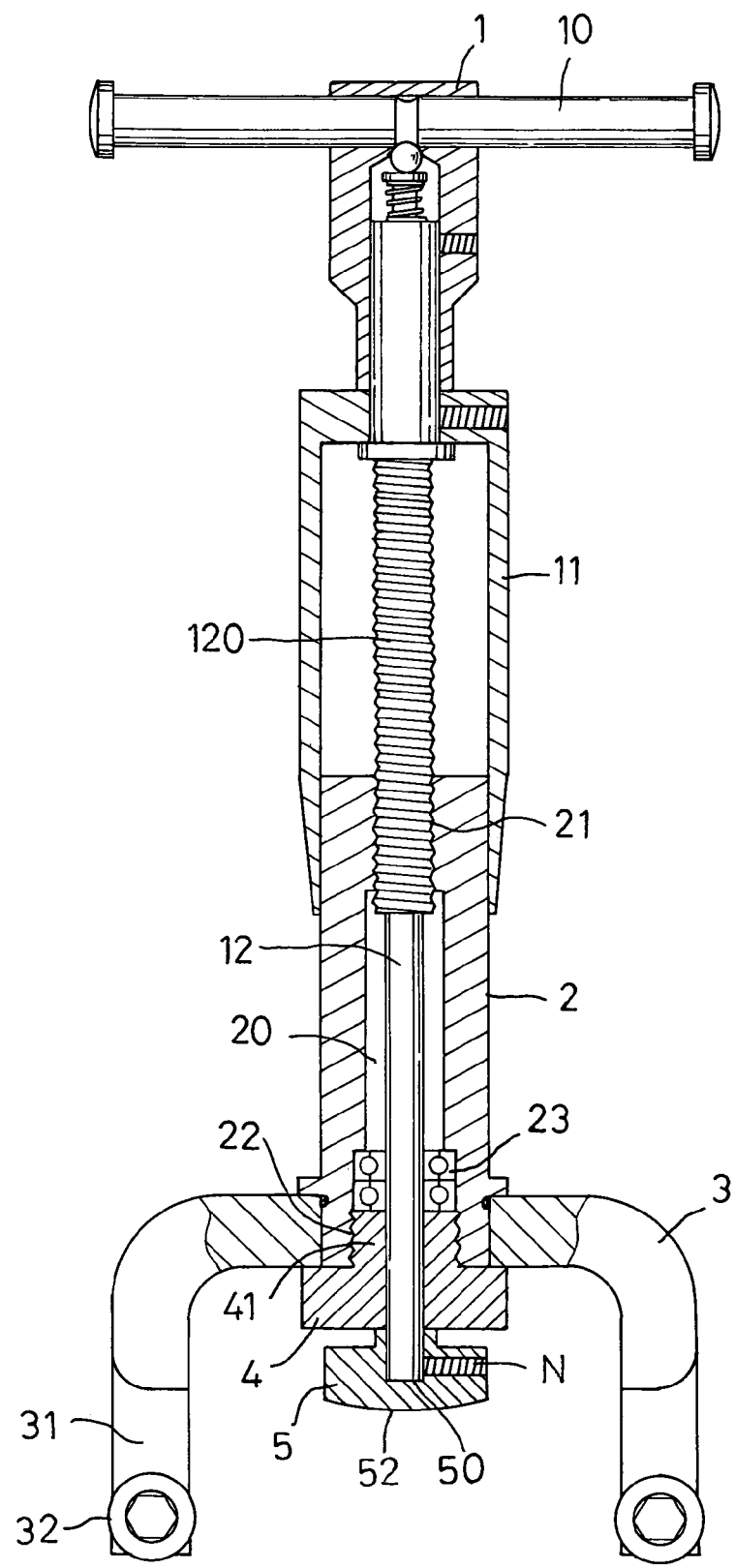
FIG. 2 is a side cross-sectional view of the device for measuring the tightness of a transmission belt in FIG. 1.
Figure 3:
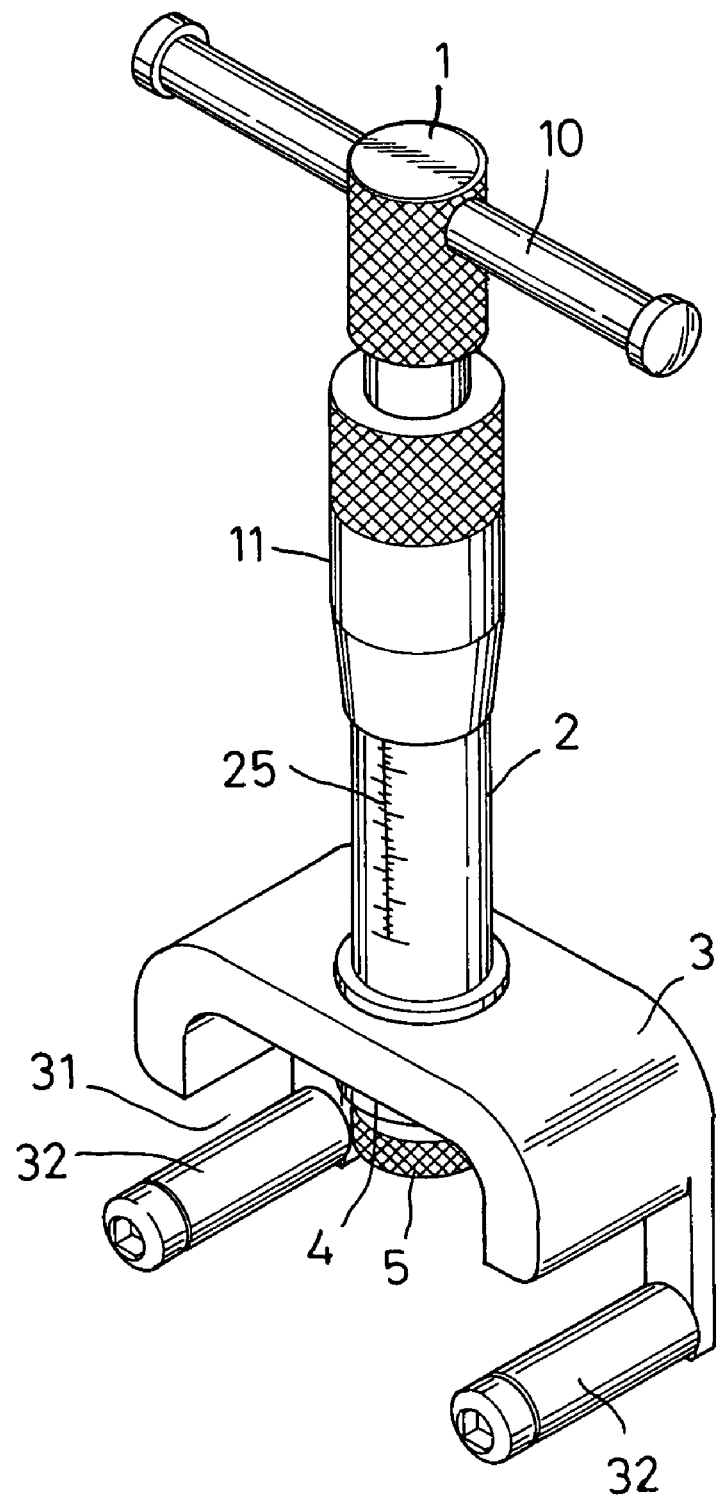
FIG. 3 is a perspective view of the device for measuring the tightness of a transmission belt in FIG. 1.

Referring to FIGS. 1 to 3, a device for measuring the tightness of a transmission belt according to the present invention comprises a hilt 1, an insertion tube 2, a frame 3, a retaining piece 4 and an engaging piece 5. The top terminal of the hilt 1 is provided with a transversely extending handle 10, whereas the bottom terminal thereof is provided with a sleeve 11 and a retractable axle 12 whose free end goes through the sleeve 11. The upper section of the retractable axle 12 is further provided with a screw thread to form a screw-thread section 120. The inner space of the insertion tube 2 forms a passage 20 for connecting the screw-thread section 120 of the retractable axle 12. The passage 20 of the insertion tube is provided with an upper screw-thread section 21 for engaging the screw-thread section 120 of the retractable axle 12 and lower screw-thread section 22. A set of annularly arranged bearings 23, defining an inner diameter equal to that of the passage 20, is installed on the lower end of the lower screw-thread section 22. Further, close to the lower portion on the outer wall of the insertion tube 2, there is an annular retaining flange 24 for fixing the insertion tube 2 on the frame 3. The outer wall of the insertion tube 2 is provided with graduations 25 for inspection. The frame 3, taking an inverted U shape, is connected to the bottom end of the insertion tube 2. The frame 3 has a top through hole 30 at the center of the top surface for the passage of the insertion tube 2. Two side arms of the frame 3 are respectively provided with holes with a screw thread 310 for each connecting horizontally extended rotatable shaft 32. Each of the rotatable shafts 32 and a corresponding side arm of the frame 3 defines a top through hole 30 for facilitating the rolling of a belt through the frame 3. More specifically, the rotatable shafts 32 are connected with the frame 3 through the engagement between the holes with a screw thread 310 and the screw-thread sections 320 of the rotatable shafts 32, which are further secured by respective nuts 321. The retaining piece 4 is connected to the bottom portion of the insertion tube 2 by screwing and has a central through hole 40 for the passage of the retractable axle 12. The upper surface of the retaining piece 4 is provided with screw-thread projection 41, thereby facilitating its connection with the lower screw-thread section 22 of the insertion tube 2. The engaging piece 5 is connected to the lower terminal of the retractable axle 12 of the hilt 1. The insertion tube 5 is provided with an retaining hole 51 for housing a horizontally inserted bolt N, whereby the engaging piece can be secured to the retractable axle 12. The bottom side of the engaging piece is further provided with a outwardly curved surface of engagement 52.

Referring to FIGS. 1 to 3, to assembly the device for measuring the tightness of a transmission belt, the frame 3 is firstly connected with the bottom of the insertion tube 2. The retaining piece 4 is then connected and secured to the bottom of the insertion tube 2. In the third place, the retractable axle 12 of the hilt 1 is brought to pass the passage 20 within the insertion tube 2, whereby the upper screw-thread section 21 of the insertion tube and the screw-thread section 120 of the retractable axle 12 can be attached by engaging the screw threads. Finally, the lower terminal of the retractable axle 12 is inserted into the insertion hole 50 of engaging piece 5 and secured therein by the bolt N in the retaining hole 51.

Figure 4:
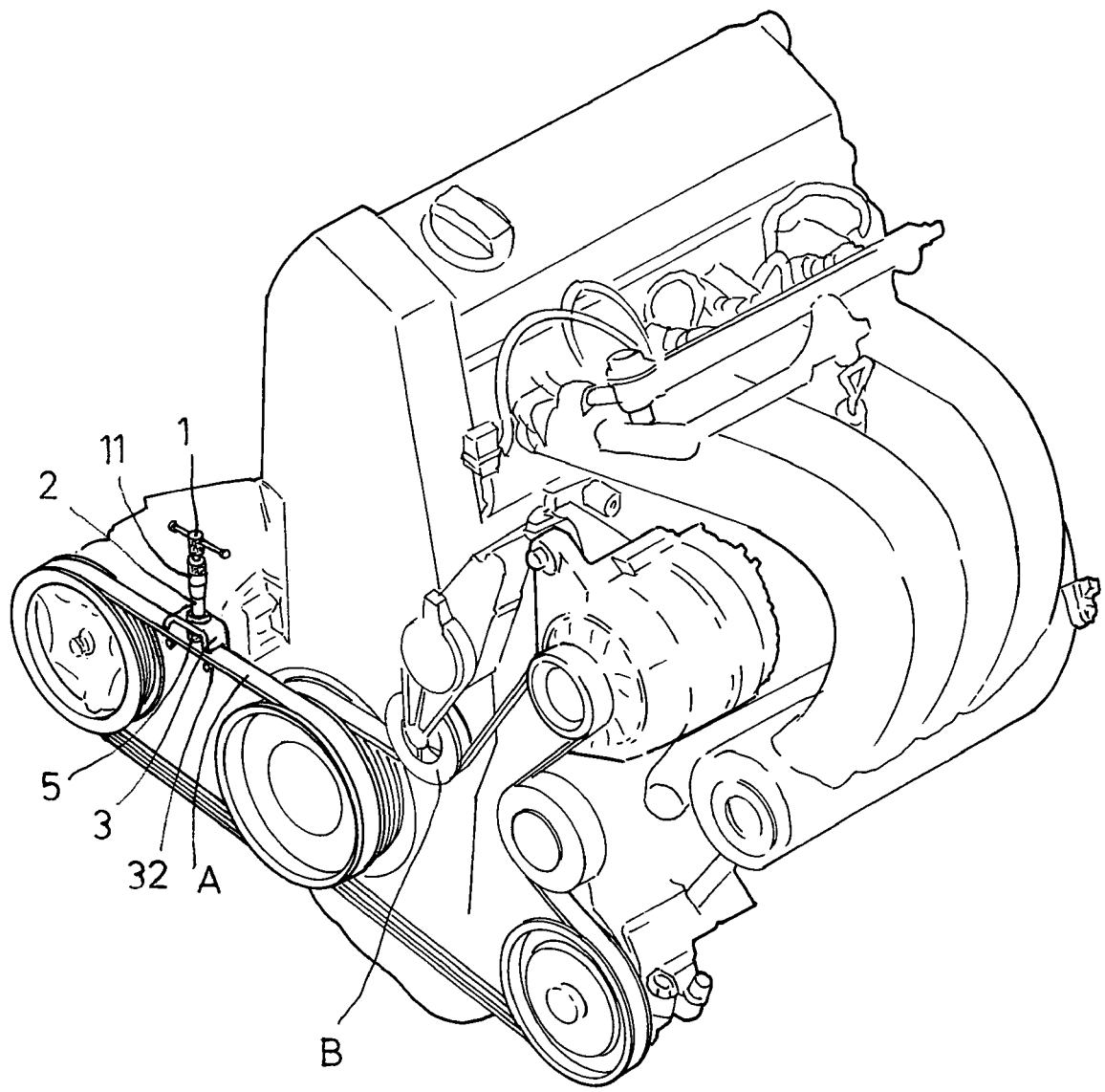
Figure 5:
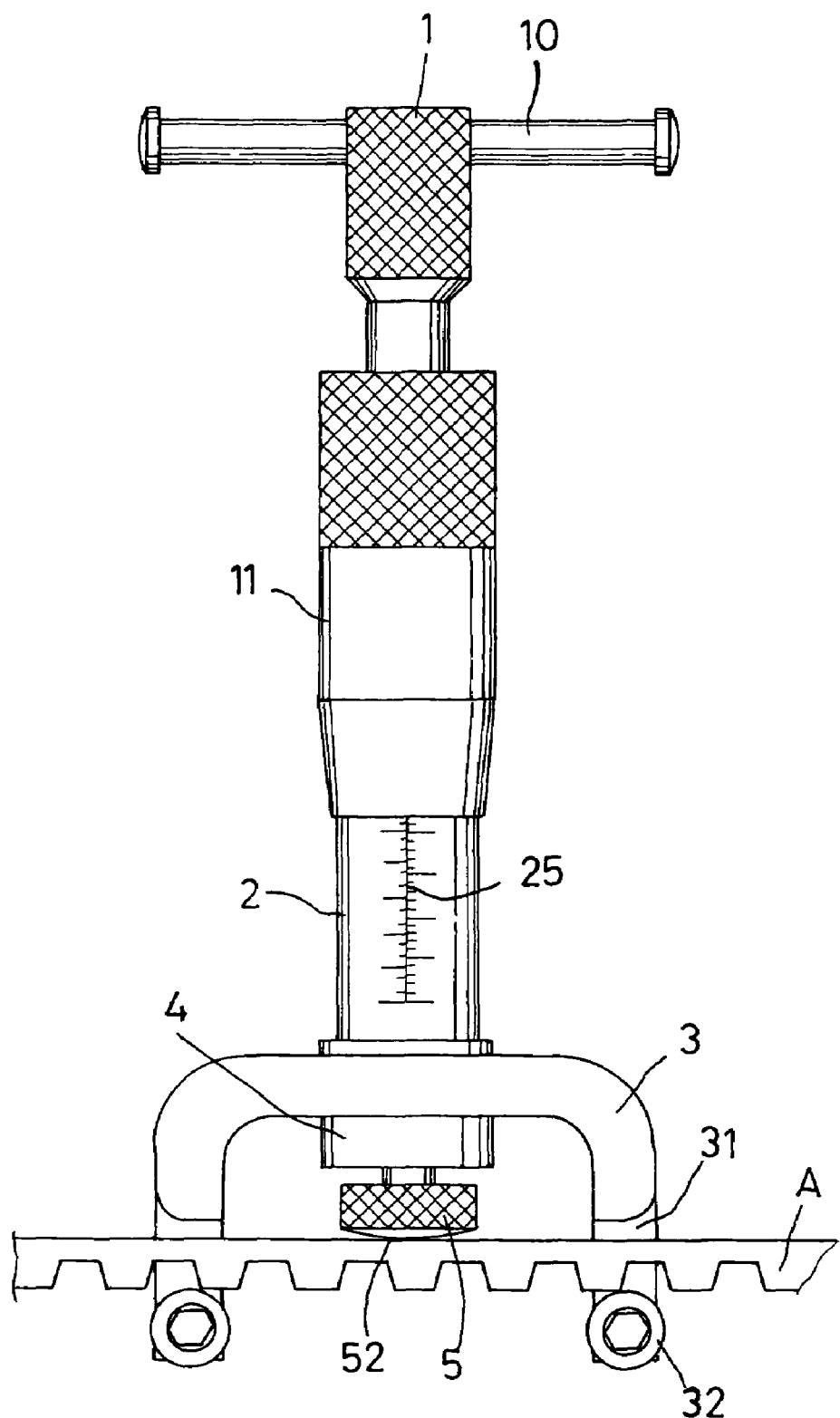
FIG. 5 illustrates the measurement of the tightness of a transmission belt by the present invention in the beginning of the process.
Figure 6:
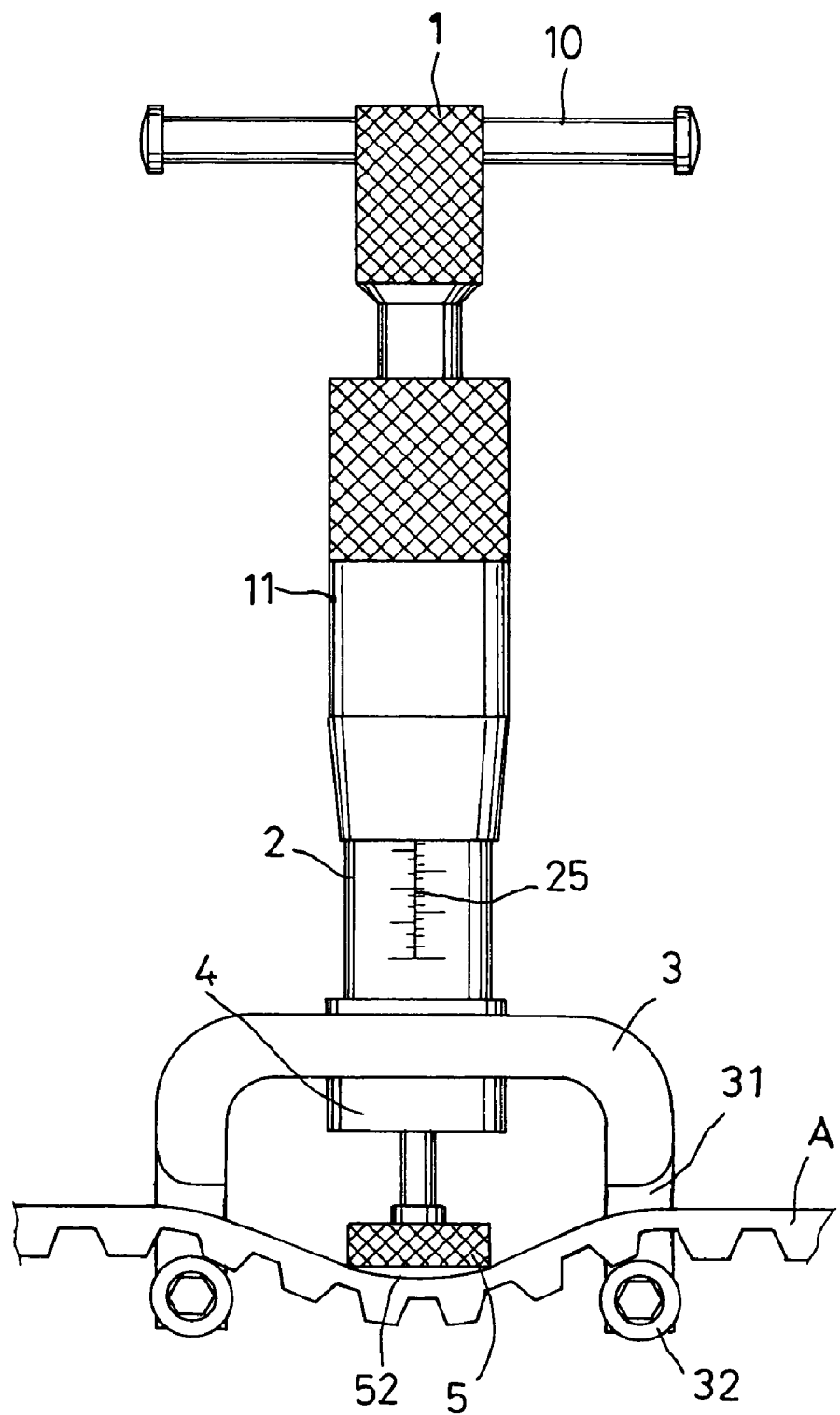
FIG. 6 illustrates the measurement of the tightness of a transmission belt by the present invention at the end of the process.

Referring to FIGS. 4 to 6, the device for measuring the tightness of a transmission belt is assembled through the following steps. Firstly, a transmission belt A is inserted through the belt-passing slots 31 of the frame 3 and placed horizontally on the rotatable shafts 32 of the belt-passing slots 31. The rotatable shafts 32 can accommodate transmission belts of various shapes, removing the possibility of getting jammed on the belt-passing slots 31 due to the teeth on the belt. The outer surface of the insertion tube 2 provided with the graduations 25 is rotated toward a angular position where the user can read. The user drives the retractable axle 12 downward by rotating the hilt 1 till the engaging piece 5 firstly touches the top surface of the belt A, and a first position indicated by the graduations 25 is registered. Secondly, the retractable axle 12 will be moved downward continuously by rotating the hilt 1 till said belt attains a predetermined tight state by the pressing of the engaging piece 5; a second position as indicated by the graduations 25 is again registered. The first and second positions will be used to determine the tightness of said belt for a future adjustment. For example, the difference of two positions exceeds 10 mm, and the retractable axle 12 of the hilt 1 can still be shifted downward without much resistance, this means that the belt A is too loose. On the other hand, when the tilt 1 is twisted downward and this encounters great resistance within 10 mm, the belt A is too tight. A tension adjusting machine B is then needed to keep the belt A on a predetermined level. Therefore, the present invention is practical and easy to user, indicating a great commercial value.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device for measuring the tightness of a transmission belt, comprising:

a hilt provided with a handle extended vertically to an axis of said hilt, a sleeve, and a retractable axle whose upper portion is further provided with a screw thread;

an insertion tube, connected to said retractable axle by screwing, whose inner space defining a passage, said passage having an upper screw-thread section to be engaged with said screw thread on said retractable axle, said passage being further provided with a lower screw-thread section, said insertion tube further including surface graduations for inspection;

a frame, attached to a bottom surface of said insertion tube, having a central through hole and two belt-passing slots respectively on two side arms of said frame, a rotatable shaft being connected to each of said belt-passing slots;

a retaining piece having an uprightly erected screw-thread projection for connecting said insertion tube and a through hole for passing said retractable axle; and an engaging piece attached to a bottom terminal of said retractable axle;

whereby a belt will be inserted through said belt-passing slots of said frame and brought into contact with said engaging piece by rotating said hilt and therefore driving said retractable axle downwardly till said engaging piece touches a top surface of said belt when a first graduation is registered, whereby said retractable axle will be moved downward continuously by rotating said hilt till said belt attains a predetermined state tightness when a second graduation is registered, and whereby said first and second graduations will be used to determine the tightness of said belt for a future adjustment.

2. The device for measuring the tightness of a transmission belt of claim 1 wherein said lower screw-thread section within said insertion tube is provided with a set of bearing for facilitating the passage of said retractable axle.

3. The device for measuring the tightness of a transmission belt of claim 1 wherein beneath each of said belt-passing slots, there is a hole with an inner thread for the insertion of a bolt section at an end of a corresponding one of said rotatable shafts; said bolt after passing said hole being secured by a nut.

4. The device for measuring the tightness of a transmission belt of claim 1 wherein said engaging piece is provided with an insertion groove for retaining a free end of said retractable axle and a lateral hole with a thread for the insertion of a bolt to fix said retractable axle within said engaging piece; further, a bottom face of said engaging piece being curved so as to smoothly engage a transmission belt.

* * * * *